(12) United States Patent
DeLillio (10) Patent No.: US 8,595,114 B2
(45) Date of Patent: Nov. 26, 2013

(54) ACCOUNT LEVEL INTERCHANGE EFFECTIVENESS DETERMINATION

(75) Inventor: Guy S. DeLillio, Wilmington, DE (US)

(73) Assignee: Bank of America Corporation, Charlotte, NC (US)

( * ) Notice: Subject to any disclaimer, the term of this patent is extended or adjusted under 35 U.S.C. 154(b) by 789 days.

(21) Appl. No.: 12/622,695

(22) Filed: Nov. 20, 2009

(65) Prior Publication Data

US 2011/0125567 A1    May 26, 2011

(51) Int. Cl.
*G06Q 40/00* (2012.01)
(52) U.S. Cl.
USPC ............................................ 705/36 R; 705/35
(58) Field of Classification Search
USPC .................. 705/14.25, 30, 35, 36 R
See application file for complete search history.

(56) References Cited

U.S. PATENT DOCUMENTS

| | | | |
|---|---|---|---|
| 2004/0236648 A1* | 11/2004 | Yip et al. | 705/30 |
| 2006/0161487 A1* | 7/2006 | Saxena et al. | 705/35 |
| 2007/0055708 A1 | 3/2007 | Phibbs, Jr. et al. | |

\* cited by examiner

*Primary Examiner* — Ojo O Oyebisi
(74) *Attorney, Agent, or Firm* — Banner & Witcoff, Ltd.; Michael A. Springs (57) ABSTRACT

Methods, computer readable media, and apparatuses for measuring, calculating, analyzing, and using account level profitability metrics are presented. Various statistics may be collected and compiled into a table, and profitability of one or more financial accounts may be determined at the account level. Interchange costs may be accounted for. Financial accounts may be classified on a variety of bases, and the results may be presented in a report.

21 Claims, 8 Drawing Sheets

ACCOUNT LEVEL INTERCHANGE EFFECTIVENESS DETERMINATION

BACKGROUND

Within a large financial institution, internal lines of business may exchange funds with, lend funds to, and borrow funds from other internal lines of business. For each line of business to make optimal decisions, it may be preferable that those making business and financial decisions have the best available information on hand. Further, internal and external reporting requirements may motivate, if not necessitate, the collection, measurement, and analysis of detailed information about various aspects of each line of business in a financial institution. In a large financial institution, however, it may be difficult to determine the components of profit and loss to a desired degree of detail.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

To collect, measure, and analyze information to support business and financial decision making, internal and external reporting, and a variety of other activities in a financial institution, it may be advantageous to measure effectiveness at the account level, which often may be the most basic level at which profits and losses are generated and incurred in a financial institution. Aspects of this disclosure relate to account level effectiveness metrics and determination. According to one or more aspects, account level effectiveness may be measured, and interchange costs may be accounted for. Statistical data may be gathered about one or more financial accounts from one or more computer databases. Subsequently, an effectiveness value for each of the financial accounts may be calculated based on the statistical data, and in making such calculations for a particular account, the interchange costs associated with the particular account may be accounted for. Thereafter, an effectiveness report that includes the effectiveness values may be generated. Optionally, each of the financial accounts may be classified as being within one or more market segments based on the calculations.

BRIEF DESCRIPTION OF THE DRAWINGS

The present disclosure is illustrated by way of example and not limited in the accompanying figures in which like reference numerals indicate similar elements.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
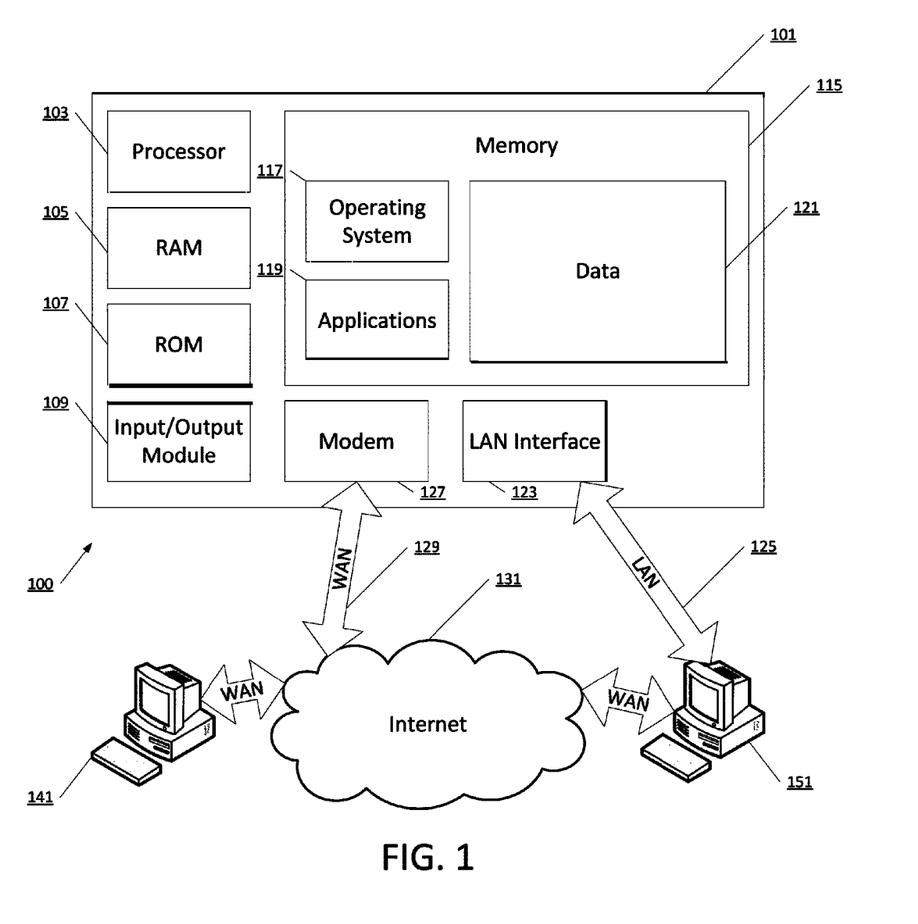
FIG. 1 illustrates a suitable operating environment in which various aspects of the disclosure may be implemented.

FIG. 1 illustrates a block diagram of a generic computing device 101 (e.g., a computer server) in computing environment 100 that may be used according to one or more illustrative embodiments of the disclosure. The computer server 101 may have a processor 103 for controlling overall operation of the server and its associated components, including random access memory (RAM) 105, read-only memory (ROM) 107, input/output (I/O) module 109, and memory 115.

I/O 109 may include a microphone, mouse, keypad, touch screen, scanner, optical reader, and/or stylus (or other input device(s)) through which a user of server 101 may provide input, and may also include one or more of a speaker for providing audio output and a video display device for providing textual, audiovisual, and/or graphical output. Software may be stored within memory 115 and/or other storage to provide instructions to processor 103 for enabling server 101 to perform various functions. For example, memory 115 may store software used by the server 101, such as an operating system 117, application programs 119, and an associated database 121. Alternatively, some or all of the computer executable instructions for server 101 may be embodied in hardware or firmware (not shown).

The server 101 may operate in a networked environment supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the computer 101 may be connected to the LAN 125 through a network interface or adapter 123. When used in a WAN networking environment, the server 101 may include a modem 127 or other network interface for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP, HTTPS, and the like is presumed.

Computing device 101 and/or terminals 141 or 151 may also be mobile terminals (e.g., mobile phones, PDAs, notebooks, and/or the like) including various other components, such as a battery, speaker, and antennas (not shown).

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 2:
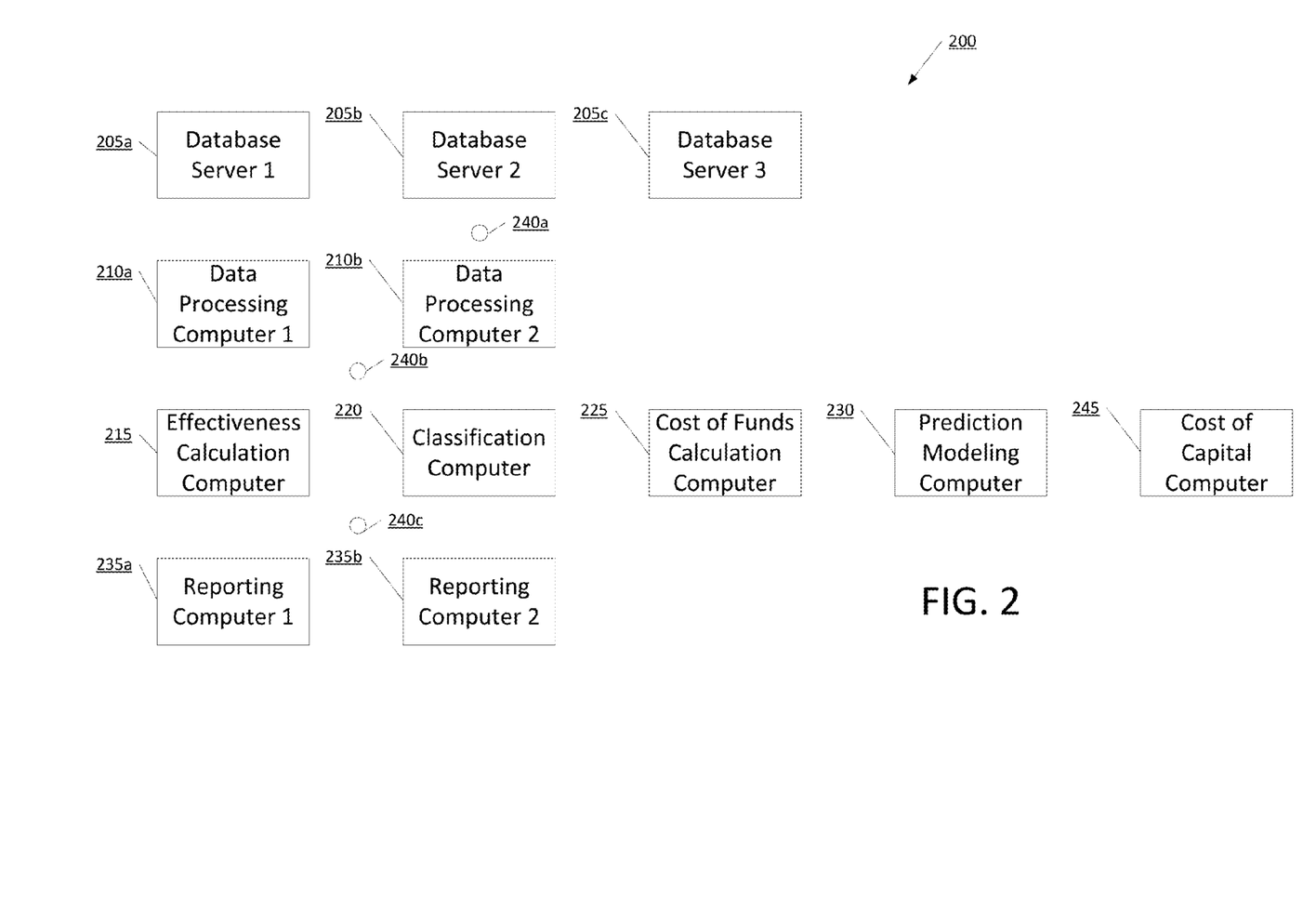
FIG. 2 illustrates a suitable network environment in which various aspects of the disclosure may be implemented.

FIG. 2 illustrates a suitable network environment in which various aspects of the disclosure may be implemented. Network environment 200 may include several computing devices. For example, network environment 200 may include one or more database servers 205*a*, 205*b*, and 205*c*. Network environment 200 further may include one or more data processing computers 210*a* and 210*b*. Data processing computers 210*a* and 210*b* may be used in measuring and calculating the effectiveness of an account according to one or more aspects described herein. For example, data processing computers 210*a* and 210*b* may gather and/or retrieve statistical data from database servers 205*a*, 205*b*, and 205*c*. Subsequently, data processing computers 210*a* and 210*b* may compile the gathered and/or retrieved statistical data into one or more comprehensive data files to enable the measurement and calculation of effectiveness of one or more accounts.

Network hubs, such as network hubs 240*a*, 240*b*, and 240*c*, may be used to connect various computers in network environment 200. For example, network hub 240*b* may be used to connect data processing computers 210*a* and 210*b* with effectiveness calculation computer 215, classification computer 220, cost of funds calculation computer 225, prediction modeling computer 230, and cost of capital computer 245.

In one or more configurations, one or more of these computers may be used in measuring and calculating the effectiveness of an account according to one or more aspects described herein. For example, effectiveness calculation computer 215 may analyze statistical data and/or one or more comprehensive data files to calculate effectiveness values for one or more accounts identified in the statistical data and/or comprehensive data files. This effectiveness calculation may involve subtracting loss items (e.g., charge offs, interest purification losses, fee purification losses, and recovery losses) from revenue items (e.g., collected fees revenue, collected interest revenue, and general revenue), wherein the loss items and revenue items used in any particular calculation may be specific to a particular account.

In another example, classification computer 220 may classify one or more accounts identified in statistical data and/or comprehensive data files. For example, classification computer 220 may classify an account as "highly effective," "moderately effective," or "not effective." Additionally or alternatively, other classifications and/or a numbered scale may be used to classify one or more accounts.

In addition to classifying an account based on the account's effectiveness (which may be determined by calculating an effectiveness value), classification computer 220 may classify an account based on the account's associated interchange costs, the cost of funds associated with one or more balances in the account, the cost of funds for a household associated with the account and possibly with other accounts, the probability of an early balance payoff in the account, and/or the risk-based cost of capital for the account. Thus, for example, classification computer 220 may classify an account as "highly effective after interchange costs deduction," "moderately effective after interchange costs deduction," or "not effective after interchange costs deduction." Such classifications may enable other decisions to be made and/or may enable incentive programs to be implemented. For example, a financial institution may be able to negotiate a lower interchange fee with a particular credit card network for accounts that are classified as having a high transaction volume. Additionally or alternatively, a financial institution may be able to implement a variable interchange fee schedule, wherein the interchange fee associated with a particular account or credit card depends on its classification, the volume of credit card transactions associated with the account, and/or the corresponding amount of interchange fees generated by the accountholder or cardholder.

In another example, classification computer 220 may classify an account as having a "high cost of funds," "moderate cost of funds," or "low cost of funds." Such classifications may indicate the internal cost of funding a credit card account, which may enable decisions to be made about which accounts to maintain and which accounts to terminate or abandon. Specifically, within a financial institution, an internal line of business, such as a credit card line of business, may have to borrow funds from another internal line of business, such as a deposit line of business. In borrowing these funds, the borrowing line of business may incur internal costs that are payable to the lending line of business, and thus in one example, the credit card line of business may incur internal costs that are payable to the deposit line of business. In some situations, it therefore may be advantageous to classify an account based upon its associated cost of funds, as in this manner, an internal line of business (e.g., the credit card line of business) may identify high-cost, low-profit accounts to terminate or abandon and/or low-cost, high-profit accounts to maintain. Additionally or alternatively, such classifications may enable decisions to be made about other matters. For example, a financial institution may create spending incentives or provide customer rewards and perks to customers who have accounts that are identified as low-cost, high-profit accounts, while the financial institution may impose fees upon or add other revenue-generating mechanisms to accounts that are identified as high-cost, low-profit accounts.

In another example, classification computer 220 may classify a household associated with the account and possibly other accounts. Specifically, classification computer 220 may classify a household associated with one or more accounts as "highly effective," "moderately effective," or "not effective." Such classifications may indicate the effectiveness of a particular household, and thus may account for profits realized and losses incurred for one or more accounts associated with the particular household. According to one or more aspects, a household classification may account for profits and losses associated with a particular household across different lines of business. For example, classification computer 220 may classify a particular household as "moderately effective," even though losses have been incurred with respect to that particular household in the credit card line of business from charge offs, because profits have been realized with respect to that particular household in the mortgage line of business. In this manner, a financial institution may be able to understand the effectiveness of a particular household from a holistic perspective. It may be advantageous to measure and understand effectiveness at the account level in this way, as a financial institution may accordingly be able to harness unexpected benefits in strategically marketing new products, adjusting fee structures and account parameters, terminating ineffective accounts, and making other business and financial decisions.

In another example, classification computer 220 may classify an account based on the probability of an early balance payoff in the account. Specifically, classification computer 220 may classify an account as "highly likely to have an early balance payoff," "moderately likely to have an early balance payoff," or "not likely to have an early balance payoff." Such classifications may indicate the probability of an early balance payoff occurring with respect to a particular account, and thus may enable a financial institution to make decisions about which accounts to maintain and which accounts to charge a fee to or terminate. In some situations, a financial institution may wish to charge a fee to or terminate an account that may be likely to have an early balance payoff, as such an account might not be effective. Specifically, because a credit card line of business within a financial institution may have to fund an account for a period of time by borrowing funds from another line of business within the financial institution, and because the credit card line of business might realize profit from the account only in certain circumstances (e.g., where interest payments are made on the outstanding account balance and where an early balance payoff does not occur), an early balance payoff in an account may cause the account to be ineffective, as the credit card line of business might not collect any interest payments or realize any other profit despite having funded the account for a period of time. In such situations, it may be desirable to charge a fee to an account that may be likely to have an early balance payoff in order to ensure that some baseline profit may be realized. Additionally or alternatively, it may be desirable to terminate an account that may be likely to have an early balance payoff in order to minimize losses that may be incurred. Thus, it may be advantageous for a financial institution to understand and predict whether an early balance payoff may be likely to occur with respect to one or more accounts.

In another example, classification computer 220 may classify an account based on the risk-based cost of capital for the account. Specifically, classification computer 220 may classify an account as having a "high risk-based cost of capital," a "moderate risk-based cost of capital," or a "low risk-based cost of capital." Additionally or alternatively, an account may be classified as having "high risk," "moderate risk," or "low risk." These various classifications may indicate the risk-based cost of capital associated with an account and/or the level of risk associated with an account, and thus may enable a financial institution to make decisions about which accounts to maintain and which accounts to terminate or abandon. In some situations, it may advantageous for a financial institution to know and understand the risk-based cost of capital associated with an account, because the risk-based cost of capital may be greater than or less than the pure opportunity cost associated with the loaned funds in the account. Specifically, because the risk-based cost of capital accounts for risk associated with the account, the risk-based cost of capital may be upwardly or downwardly adjusted from a non-risk based cost of capital (e.g., a cost of capital which may be computed solely on the basis of opportunity cost).

In one or more additional configurations, cost of funds calculation computer 225 may analyze statistical data and/or one or more comprehensive data files to calculate a cost of funds associated with a particular account or household. Cost of funds calculation computer 225 may feed the results of its analysis and other data to classification computer 220 to enable classification of one or more accounts or households, and cost of funds calculation computer 225 may feed such results and data to other computers to enable other services. For example, cost of funds calculation computer 225 may compute the cost of funds for a particular account by loading account data from a comprehensive data file, analyzing the one or more balances that may be outstanding in the account, determining the cost of funds associated with each of the outstanding balances based upon a cost of funds rate that corresponds to (and may vary with) each of the outstanding balances, and summing the computed cost of funds amounts to arrive at the total cost of funds for the account. Additionally or alternatively, this process may be repeated or modified to compute the cost of funds associated with a particular household, by performing the foregoing steps with respect to each account associated with the particular household.

In one or more additional configurations, prediction modeling computer 230 may analyze statistical data and/or one or more comprehensive data files to generate a prediction model and predict the probability of an early balance payoff occurring in one or more accounts. Prediction modeling computer 230 may feed the results of its analysis and other data to classification computer 220 to enable classification of one or more accounts, and prediction modeling computer 230 may feed such results and data to other computers to enable other services. For example, prediction modeling computer 230 may generate a prediction model and predict the probability of an early balance payoff by loading account data from a comprehensive data file, analyzing the interest rates and balance amounts (and combination thereof and other relevant data) of accounts in which an early balance payoff has occurred, computing a regression or other predictive function based on the analysis and other data, and applying the regression or other predictive function to a particular account for which the probability of an early balance payoff is to be determined. Additionally or alternatively, prediction modeling computer 230 may suggest a fee amount to be charged in the event of an early balance payoff, and the fee amount may be calculated and selected to ensure that some baseline profit may be realized. Additionally or alternatively, prediction modeling computer 230 may suggest a fee amount to be charged in the event of an early balance payoff that will approximate or equal the amount of revenue that would otherwise have been realized had the balance remained pending (and had interest payments been collected) for the full period.

In one or more additional configurations, cost of capital computer 245 may analyze statistical data and/or one or more comprehensive data files to calculate a risk-based cost of capital. Cost of capital computer 245 may feed the results of its analysis and other data to classification computer 220 to enable classification of one or more accounts or households, and cost of capital computer 245 may feed such results and data to other computers to enable other services. For example, cost of capital computer 245 may compute the risk-based cost of capital for a particular account by loading account data from a comprehensive data file, calculating an account-specific loss forecast, analyzing account-specific risk data to determine the level of risk associated with one or more balances that may be outstanding in the account, and adjusting the pure opportunity-cost-based cost of capital in view of the loss forecast and/or the results of the analysis of the account-specific risk data, thus arriving at the risk-based cost of capital. In one or more arrangements, the loss forecast may indicate the probability of future losses in a particular financial account, and the loss forecast may be calculated by extrapolating from historical data about the particular financial account.

According to one or more aspects, network environment 200 may further include one or more reporting computers, such as reporting computers 235a and 235b. Reporting computers 235a and 235b may be connected to one or more other computers in network environment 200 via a network hub, such as network hub 240c. Reporting computers 235a and 235b may generate one or more reports based on the data gathered and retrieved and on the analysis conducted, and reporting computers 235a and 235b further may transmit such reports to external and/or internal reviewers. For example, reporting computer 235a may generate a report that includes statistical data and/or other data obtained from other computers in network environment 200, such as effectiveness calculation results from effectiveness calculation computer 215, classification results from classification computer 220, cost of funds calculation results from cost of funds calculation computer 225, prediction modeling results from prediction modeling computer 230, and/or risk-based cost of capital results from cost of capital computer 245. Subsequently, reporting computer 235a may transmit the generated report to external and internal reviewers, such as an outside consulting firm, a law firm, an internal compliance team, a strategy development and management team, a senior executive committee, or the like.

While the foregoing paragraphs describe network environment 200 as including various computers adapted to perform various functions, it should be understood that the system may be modified to include a greater or lesser number of computers that may be used to provide the same functionality. For example, a single computer may be used to perform all of the functions described, and one or more users may interact with the single computer through one or more terminals and/or user interfaces.

Figure 3:
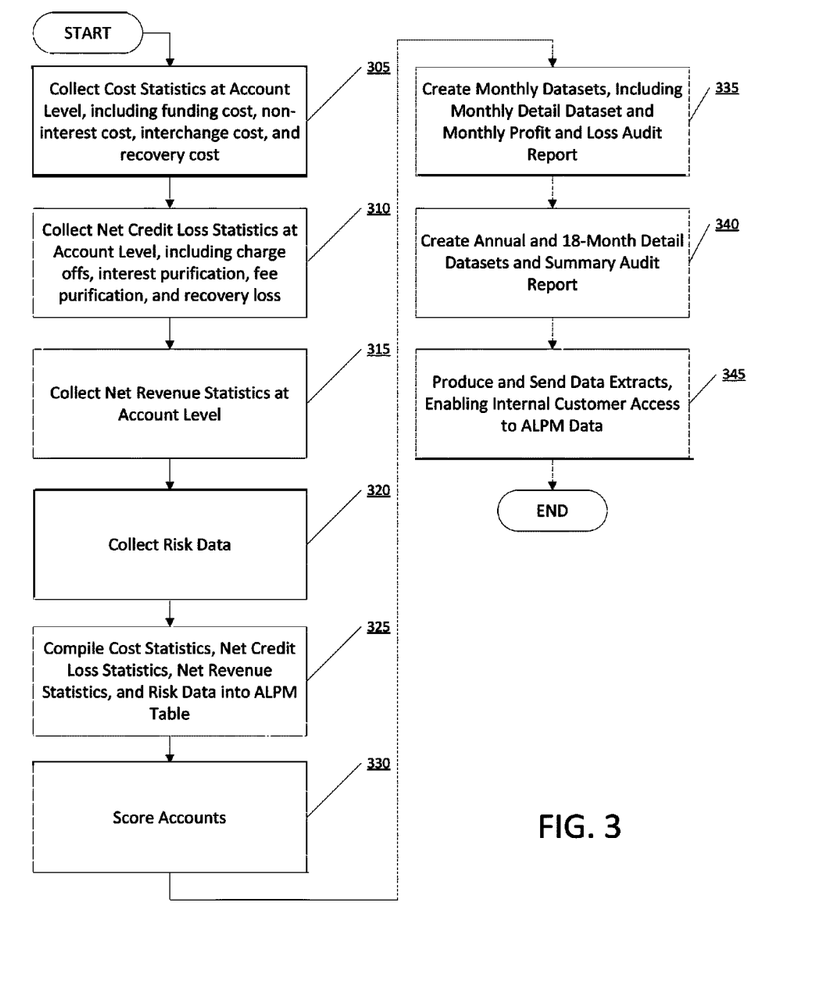
FIG. 3 illustrates a method by which a financial institution may measure account level effectiveness according to one or more aspects described herein.

FIG. 3 illustrates a method by which a financial institution may measure account level effectiveness according to one or more aspects described herein. According to one or more aspects, the methods described herein may be implemented by software executed on one or more computers and/or in a network environment, such as network environment 200. In addition, one or more aspects of this disclosure may be implemented with respect to one or more different products of and/or lines of business within a financial institution.

In step 305, cost statistics may be collected at the account level, and these cost statistics may include the funding cost, non-interest cost, interchange cost, and recovery cost for each account. The funding cost, which may alternatively be referred to as "the cost of funds," may represent the internal cost of funding the account. For example, in a credit card account where a customer has made one or more purchases with an associated credit card, the funding cost may be the internal cost of lending the funds to the customer and covering the money used to make the one or more purchases. The funding cost thus may depend upon one or more interest rates, which may represent the opportunity cost of lending the funds, as the funding cost may include not only the actual amount lent, but also the opportunity lost. The non-interest cost may represent charges and fees that may be incurred in the lending process and that might not be accounted for in the funding cost. The interchange cost may represent the transactional costs associated with processing one or more credit card transactions. Specifically, the interchange cost may represent a fee charged by a credit card processor for processing a credit card transaction. The recovery cost may represent the costs associated with recovering property purchased with a credit card after the accountholder associated with the credit card has refused to make payments that are owed. For example, the recovery cost may include the cost of hiring a third party contractor to locate the accountholder and repossess the relevant property. Additionally, the recovery cost may be associated with the recovery loss, which is further described below.

In step 310, net credit loss statistics may be collected at the account level, and these net credit loss statistics may include charge off loss, interest purification loss, fee purification loss, and recovery loss for each account. More specifically, the charge off loss may represent the loss realized by a financial institution with respect to a particular account when the financial institution writes off outstanding debt obligations it is owed as uncollectible. The interest purification loss may represent the amount of accrued interest subtracted from a ledger that accounts for receivables when a financial institution writes off an outstanding debt. In other words, the interest purification loss may represent the amount of accrued interest that the financial institution may no longer expect to collect with respect to a particular account because a charge off may have occurred. The fee purification loss may represent the amount of fees that is subtracted from a ledger that accounts for receivables when a financial institution writes off an outstanding debt. In other words, the fee purification loss may represent the amount of fees that the financial institution may no longer expect to collect with respect to a particular account because a charge off may have occurred. The recovery loss may represent a loss amounting to the difference between the current value of property purchased with a credit card and the amount originally paid for the property, and the recovery loss may result from an accountholder associated with the credit card refusing to make payments that are owed. For example, the recovery loss may represent the difference between the current value of a television that has been or is to be repossessed and the amount originally charged to a relevant credit card when the accountholder purchased the television.

In step 315, net revenue statistics may be collected at the account level. The net revenue statistics may include revenue realized with respect to a particular account that may come from a variety of sources. For example, the net revenue statistics for a particular account may represent revenue realized from fees, interest, and other receivables collected by the financial institution with respect to the particular account.

In step 320, risk data may be collected. Risk data may include both general risk data and account-specific risk data. For example, risk data may include both general risk data, such as general economic forecast data based on current economic conditions, and account-specific risk data, such as the current outstanding account balance, the current amount of unpaid fees in the account, the current amount of unpaid accrued interest in the account, the past payment history for the account, the credit score of the accountholder, and the like.

In step 325, cost statistics, net credit loss statistics, net revenue statistics, and risk data may be compiled into an account level effectiveness metrics table. In one or more configurations, the account level effectiveness metrics table may be a spreadsheet and/or a database file in one or more commercially-available file formats.

In step 330, accounts may be scored. More specifically, for each of the one or more accounts identified in the account level effectiveness metrics table, account level profit may be calculated by subtracting account-specific cost statistics and account-specific net credit loss statistics from corresponding account-specific revenue statistics. Subsequently, an account-specific score may be assigned to each account identified in the account level effectiveness metrics table based on the calculated account level profit and on the risk data. The account-specific score may be a numerical value that may be calculated by adding the account level profit with quantitative elements of the risk data and optionally with numerical values assigned to non-quantitative elements of the risk data (e.g., numerical values assigned to varying types of past payment history for the account). In one or more configurations, the account-specific score may be weighted, such that account level profit may affect the account-specific score more than the risk data associated with the account, or vice-versa. For example, because of weighting, a highly effective account that is associated with high risk, as identified by the risk data, may be assigned a lower score than a moderately effective account that is associated with low risk.

In step 335, monthly datasets may be created, and these monthly datasets may include a monthly detail dataset and a monthly profit and loss audit report. The monthly detail dataset may be embodied in one or more computer data files, and it may include detailed cost, loss, revenue, risk, and profit information for each account. Additionally or alternatively, the monthly detail dataset (along with any other dataset and/or report described herein) may be organized by portfolio, account, segment, channel, group, product, enterprise segment, and/or enterprise, in descending order of granularity. For example, the monthly detail dataset may be a comprehensive monthly report that includes most or all of the information in the account level effectiveness metrics table, along with analysis of that information, such as profit and loss calculations, trend data and graphs, forecast data and graphs, and the like. The monthly profit and loss audit report may be embodied in one or more computer data files, and it may include, among other things, detailed profit and loss information organized in a manner to enable auditing. For example, because it may be preferable to feed data at a higher level of abstraction to the auditing process, the monthly profit and loss audit report may be a less comprehensive report than the monthly detail dataset in that the monthly profit and loss audit report might omit lower level data and instead show data at a higher level of abstraction (e.g., the monthly profit and loss audit report might show data only at the product level, enterprise segment level, and enterprise level).

In step 340, annual and eighteen-month detail datasets and summary audit reports may be created. The annual and eighteen-month detail datasets may be embodied in one or more computer data files, and they may include information similar to the information contained in the monthly detail dataset for the preceding year and/or eighteen-month period. For example, the annual and eighteen-month detail datasets may be comprehensive reports that include most or all of the information in the account level effectiveness metrics table for each month in the preceding twelve and/or eighteen months, along with analysis of that information, such as profit and loss calculations, trend data and graphs, forecast data and graphs, and the like. The summary audit report may be embodied in one or more computer data files, and it may include information similar to the information contained in the monthly profit and loss audit report for the preceding year and/or eighteen-month period. Thus, the summary audit report may facilitate auditing over a longer time period (e.g., the preceding twelve or eighteen months) than the monthly profit and loss audit report.

In step 345, data extracts may be produced and sent to one or more internal users within a financial institution to enable internal customer access to the data contained in the account level effectiveness metrics table. The data extracts may include content from one or more of the reports described herein, in part or in full, along with other data from the account level effectiveness metrics table and/or other sources. According to one or more aspects, the data extracts may be used in making business and financial decisions and/or may be used in other processes described herein. Additionally or alternatively, data extracts may be produced and sent to one or more internal users within a financial institution and/or one or more external users.

Figure 4:
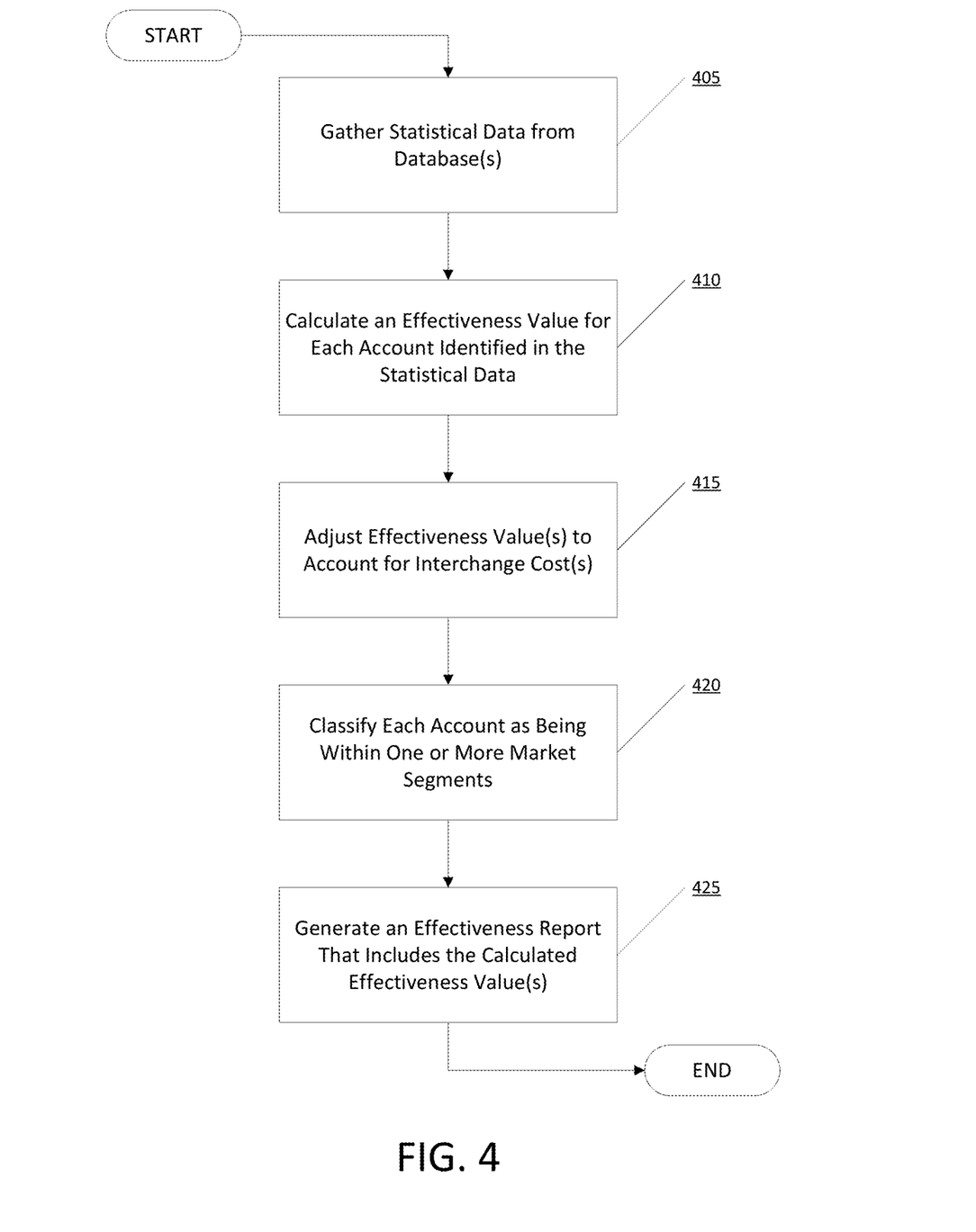
FIG. 4 illustrates a method by which a financial institution may classify one or more financial accounts based on the effectiveness of each account and the interchange costs associated with each account according to one or more aspects described herein.

FIG. 4 illustrates a method by which a financial institution may classify one or more accounts based on the effectiveness of each account and the interchange costs associated with each account. In step 405, statistical data may be gathered from one or more databases. For example, statistical data may be collected and/or compiled as described above.

In step 410, an effectiveness value for each account identified in the statistical data may be calculated. In one or more configurations, an effectiveness value for each account may be calculated by an effectiveness calculation in which cost items (e.g., funding costs, non-interest costs, interchange costs, and recovery costs) and loss items (e.g., charge offs, interest purification losses, fee purification losses, and recovery losses) may be subtracted from revenue items (e.g., collected fees revenue, collected interest revenue, and general revenue), wherein the cost items, loss items, and revenue items may be specific to a particular account under consideration.

In step 415, the one or more calculated effectiveness values may be adjusted to account for interchange costs. Specifically, the interchange costs associated with each account may be subtracted from the particular account's corresponding calculated effectiveness value to produce an adjusted effectiveness value that accounts for interchange costs. In this manner, the true effectiveness of a particular account may be calculated more accurately. For example, a credit card account may have twelve associated credit card transactions in a one-month period, and each credit card transaction may incur a flat interchange fee of $2.00. Thus, in this example, the interchange costs associated with the credit card account may be $24.00, and so $24.00 may be subtracted from the credit card account's corresponding calculated effectiveness value to produce the adjusted effectiveness value for the credit card account. In one or more configurations, the interchange fee may vary based on the quantity of transactions, the amount of any given transaction, or the like, and such variance may be accounted for in calculating the interchange costs associated with a particular account.

In step 420, each account identified in the statistical data may be classified as being within one or more market segments. In one or more arrangements, this classification may be based on the adjusted effectiveness value that accounts for interchange costs. For example, an account may be classified as "highly effective after interchange costs deduction," "moderately effective after interchange costs deduction," or "not effective after interchange costs deduction." Such classifications may be based on a tiered classification system wherein different adjusted effectiveness values correspond to different classifications. For example, an account that has an adjusted effectiveness value of $12.02 may be classified as "not effective after interchange costs deduction," whereas an account that has an adjusted effectiveness value of $2884.00 may be classified as "highly effective after interchange costs deduction."

In step 425, an effectiveness report that includes the calculated effectiveness values for each account may be generated. The generated report also may include the interchange costs for each account, the adjusted effectiveness values for each account, and the classification for each account. Thus, the generated report may enable a financial institution to make a variety of strategic decisions, such as, for example, decisions regarding the implementation of credit card incentive programs to encourage accountholder spending activity that may result in higher profits for the financial institution. Additionally or alternatively, the generated report may enable a financial institution to leverage information in negotiating interchange fees with a particular credit card network, which may further allow the financial institution to implement a tiered interchange fee scheme, wherein a first account with a first classification may be associated with a first interchange fee, while a second account with a second classification may be associated with a second interchange fee, the classifications and interchange fees being different. In other words, one or more aspects of this method may allow a financial institution to implement a variable interchange fee schedule, wherein the interchange fee associated with a particular account or credit card depends on its classification, the volume of credit card transactions associated with the account, and/or the corresponding amount of interchange fees generated by the accountholder.

Figure 5:
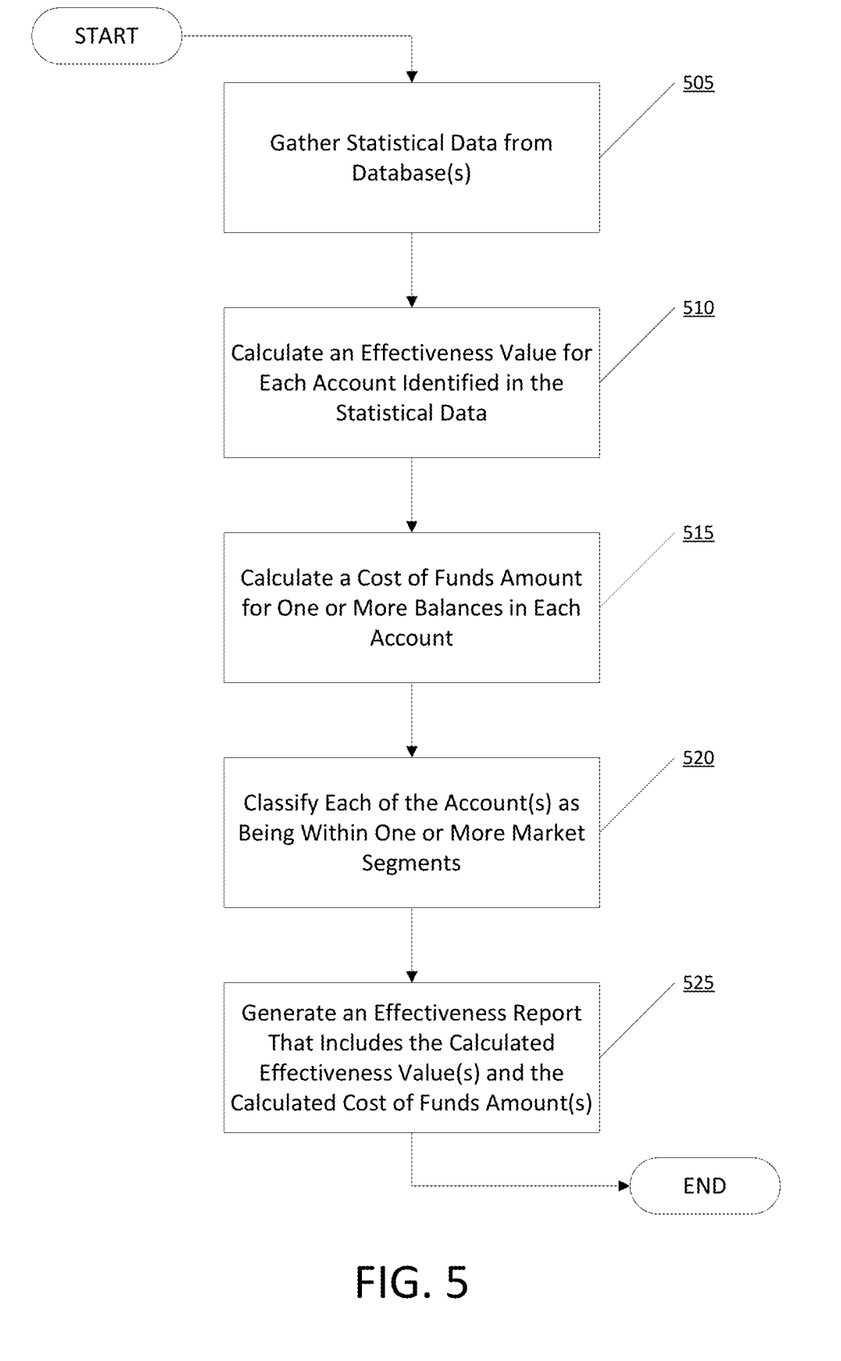
FIG. 5 illustrates a method by which a financial institution may classify one or more financial accounts based on the effectiveness of each account and the cost of funds associated with one or more balances in the given account according to one or more aspects described herein.

FIG. 5 illustrates a method by which a financial institution may classify one or more accounts based on the effectiveness of each account and the cost of funds associated with one or more balances in the given account. In step 505, statistical data may be gathered from one or more databases. For example, statistical data may be collected and/or compiled as described above.

In step 510, an effectiveness value for each account identified in the statistical data may be calculated. In one or more configurations, an effectiveness value for each account may be calculated by an effectiveness calculation in which cost items (e.g., funding costs, non-interest costs, interchange costs, and recovery costs) and loss items (e.g., charge offs, interest purification losses, fee purification losses, and recovery losses) may be subtracted from revenue items (e.g., collected fees revenue, collected interest revenue, and general revenue), wherein the cost items, loss items, and revenue items may be specific to a particular account under consideration, as further described above.

In step 515, a cost of funds amount for one or more balances in each account may be calculated. According to one or more aspects, calculating a cost of funds amount for one or more balances in each account may involve analyzing the one or more balances that may be outstanding in the account, determining the cost of funds associated with each of the outstanding balances based upon a cost of funds rate that corresponds to (and may vary with) each of the outstanding balances, and summing the computed cost of funds amounts to arrive at the total cost of funds for the account. For example, a particular credit card account may have a first balance that is associated with a first cost of funds rate and a second balance that is associated with a second cost of funds rate. In order to determine the cost of funds associated with each of the outstanding balances, each balance may be multiplied by its corresponding cost of funds rate. Thus, a first balance of $100.00 may have a first cost of funds rate of 1.07%, while a second balance of $200.00 may have a second cost of funds rate of 1.14%. Given these exemplary values, the calculated cost of funds amount for the first balance may be $107.00, and the calculated cost of funds amount for the second balance may be $228.00, yielding a total cost of funds for the account of $335.00. In other words, it may cost a financial institution $335.00 to fund this exemplary credit card account, which has a first balance of $100.00 with an associated first cost of funds rate of 1.07% and a second balance of $200.00 with an associated second cost of funds rate of 1.14%. For the financial institution to make a profit in this example, the financial institution thus might have to collect at least $35.00 in fees and interest from the accountholder, in addition to the $300.00 actually spent by the accountholder. In this example, the first cost of funds rate and the second cost of funds rate might be different because the first balance and the second balance were incurred at different points in time, because the first balance is subject to a promotional interest rate while the second balance is subject to a standard interest rate, or because of any other reason.

In step 520, each account identified in the statistical data may be classified as being within one or more market segments. In one or more arrangements, this classification may be based on the summed total cost of funds amount for the account. For example, an account may be classified as having a "high cost of funds," "moderate cost of funds," or "low cost of funds." Such classifications may be based on a tiered classification system wherein different cost of funds amounts correspond to different classifications. For example, an account that has a summed total cost of funds of $2884.00 may be classified as having a "high cost of funds," whereas an account that has a summed total cost of funds of $12.02 may be classified as having a "low cost of funds." Additionally or alternatively, this classification may be based on the various cost of funds rates associated with different balances in the account and/or may be based on the difference between the summed total cost of funds and the sum of the outstanding balances. For example, in the above example where the financial institution might have to collect at least $35.00 in fees and interest from the accountholder to profit, the account may be classified on the basis of that $35.00 figure, rather than on the total cost of funds for the account, which in that example was $335.00.

In step 525, an effectiveness report that includes the calculated effectiveness values for each account and the calculated cost of funds amount for each account may be generated. The generated report also may include the classification for each account. Thus, the generated report may enable a financial institution to make a variety of strategic decisions, such as, for example, decisions regarding which accounts to terminate or abandon and which accounts to maintain, as further discussed above.

Figure 6:
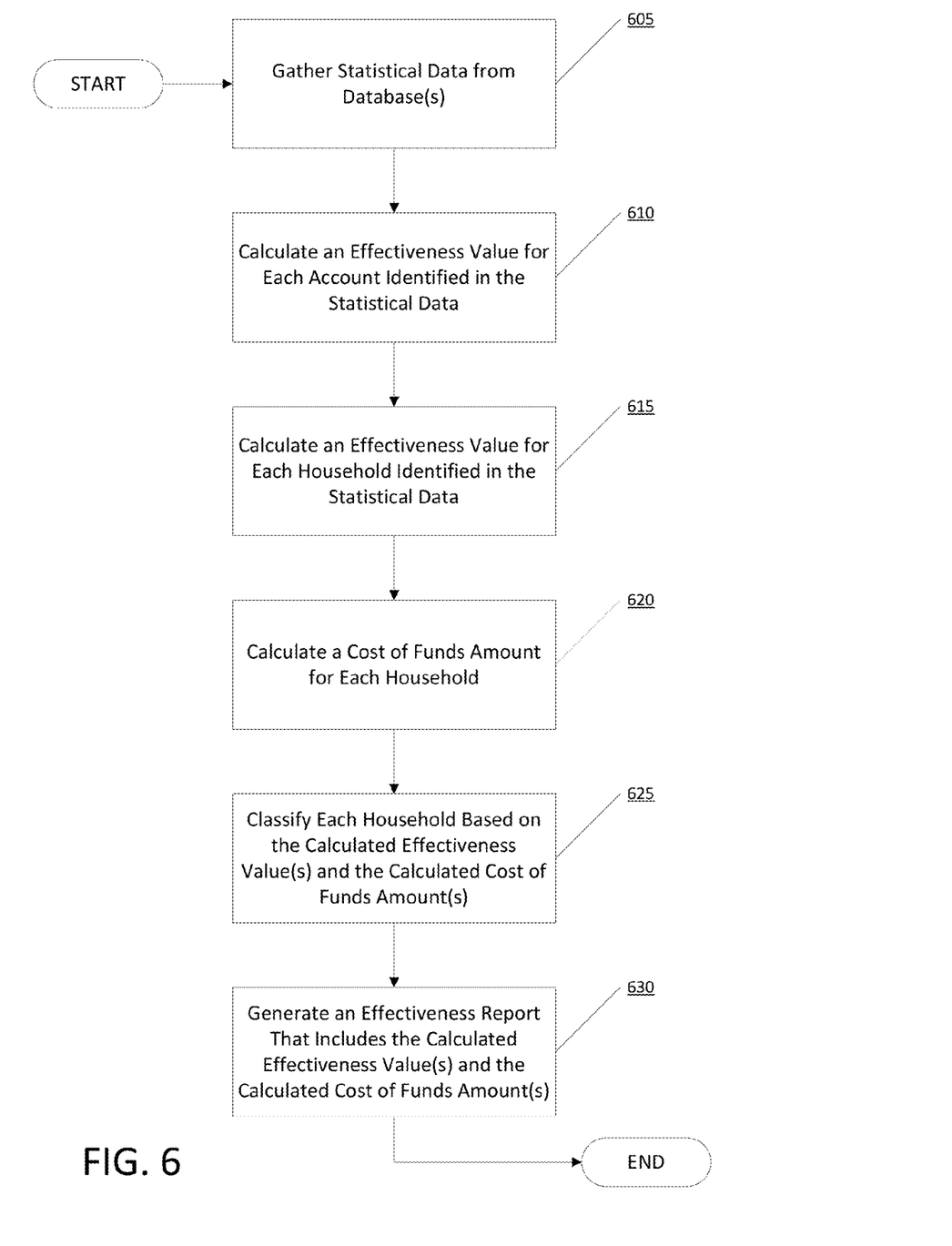
FIG. 6 illustrates a method by which a financial institution may classify one or more households based on the effectiveness realized from each household based on the one or more financial accounts associated with each household according to one or more aspects described herein.

FIG. 6 illustrates a method by which a financial institution may classify one or more households based on the effectiveness realized from each household based on the one or more accounts associated with each household. In step 605, statistical data may be gathered from one or more databases. For example, statistical data may be collected and/or compiled as described above.

In step 610, an effectiveness value for each account identified in the statistical data may be calculated. In one or more configurations, an effectiveness value for each account may be calculated by an effectiveness calculation in which cost items (e.g., funding costs, non-interest costs, interchange costs, and recovery costs) and loss items (e.g., charge offs, interest purification losses, fee purification losses, and recovery losses) may be subtracted from revenue items (e.g., collected fees revenue, collected interest revenue, and general revenue), wherein the cost items, loss items, and revenue items may be specific to a particular account under consideration, as further described above.

In step 615, an effectiveness value for each household identified in the statistical data may be calculated. According to one or more aspects, an effectiveness value for each household may be calculated by summing the one or more effectiveness values for each account associated with the particular household. For example, the statistical data may identify that both Account #########1 and Account #########2 are associated with Household ABC. In this example, the effectiveness value for Household ABC may be calculated by summing the effectiveness value of Account #########1 with the effectiveness value of Account #########2. Additionally or alternatively, the effectiveness value for each household may account for profits and losses realized with respect to a particular household across different lines of business, as further discussed above.

In step 620, a cost of funds amount for each household identified in the statistical data may be calculated. Specifically, a cost of funds amount for each household may be calculated by summing the cost of funds amount for each account associated with the particular household. As described above, calculating the cost of funds amount for an account may involve calculating a cost of funds amount for one or more balances in the account. Furthermore, calculating a cost of funds amount for one or more balances in each account may involve analyzing the one or more balances that may be outstanding in the account, determining the cost of funds associated with each of the outstanding balances based upon a cost of funds rate that corresponds to (and may vary with) each of the outstanding balances, and summing the computed cost of funds amounts to arrive at the total cost of funds for the account, as described above. Thus, once the cost of funds amount for each account associated with a particular household is determined, the cost of funds amount for the particular household may be calculated.

In step 625, each household in the statistical data may be classified as being within one or more market segments. In one or more arrangements, this classification may be based on the calculated effectiveness values and the calculated cost of funds amounts for the particular household. For example, a household may be classified as "highly effective," "moderately effective," or "not effective." Such classifications may be based on a tiered classification system, wherein different effectiveness values and cost of funds amounts correspond to different classifications. For example, a first household that has a effectiveness value of $914.53 and a cost of funds amount of $426.58 may be classified as "highly effective," whereas a second household that has an effectiveness value of $12.02 and a cost of funds amount of $215.86 may be classified as "not effective."

In step 630, an effectiveness report that includes the calculated effectiveness values and the calculated cost of funds amounts for each household may be generated. The generated report also may include the classification for each household. Thus, the generated report may enable a financial institution to understand the effectiveness of a particular household from a holistic perspective and to make a variety of strategic decisions, such as, for example, decisions regarding which accounts to terminate or abandon and which accounts to maintain, as further discussed above.

Figure 7:
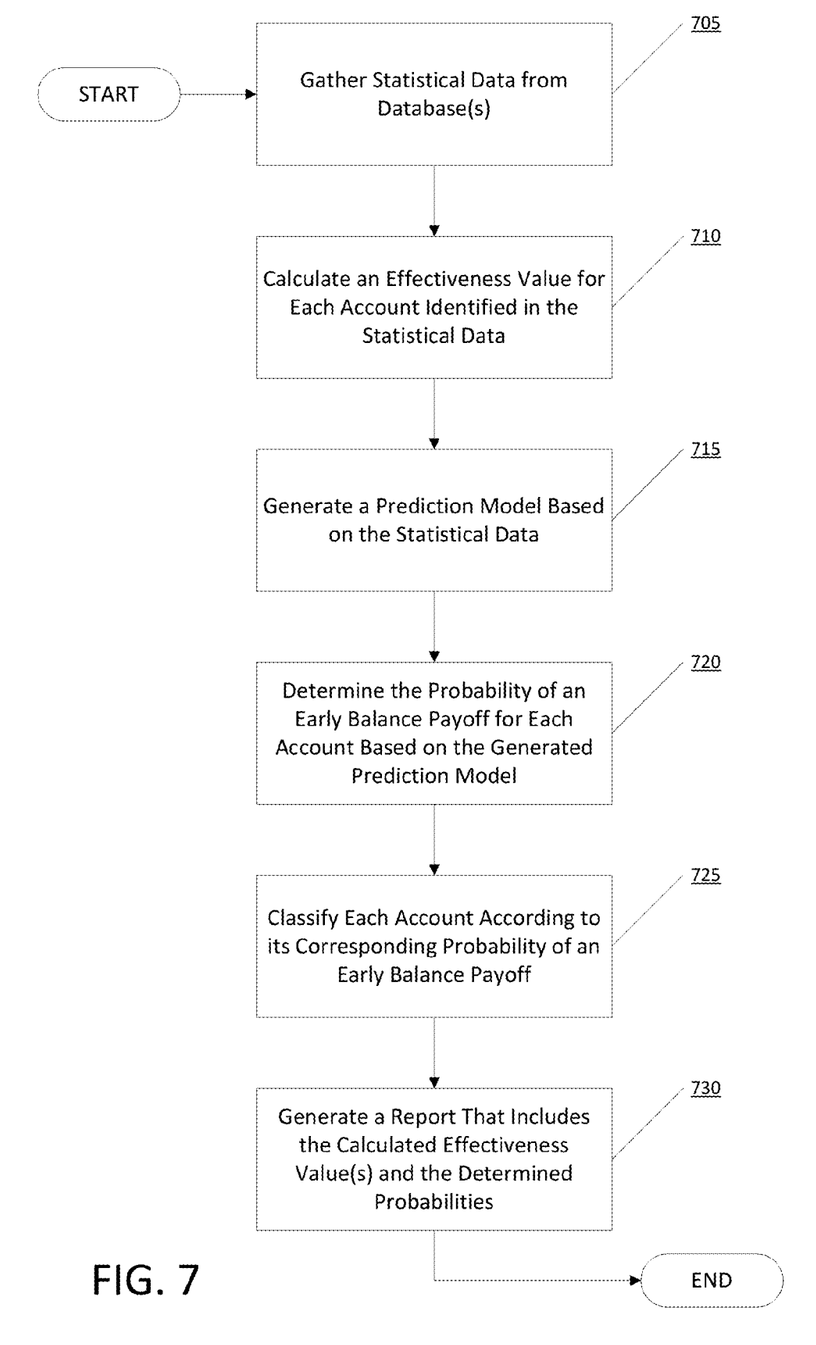
FIG. 7 illustrates a method by which a financial institution may classify one or more financial accounts using a prediction model that predicts the probability of an early balance payoff in each account according to one or more aspects described herein.

FIG. 7 illustrates a method by which a financial institution may classify one or more accounts using a prediction model that predicts the probability of an early balance payoff in each account. In step 705, statistical data may be gathered from one or more databases. For example, statistical data may be collected and/or compiled as described above.

In step 710, an effectiveness value for each account identified in the statistical data may be calculated. In one or more configurations, an effectiveness value for each account may be calculated by an effectiveness calculation in which cost items (e.g., funding costs, non-interest costs, interchange costs, and recovery costs) and loss items (e.g., charge offs, interest purification losses, fee purification losses, and recovery losses) may be subtracted from revenue items (e.g., collected fees revenue, collected interest revenue, and general revenue), wherein the cost items, loss items, and revenue items may be specific to a particular account under consideration, as further described above.

In step 715, a prediction model may be generated based on the statistical data. In one or more arrangements, a prediction model may be generated by analyzing the interest rates and balance amounts (and combination thereof and/or other relevant data) of accounts in which an early balance payoff has occurred, and then computing a regression or other predictive function based on the analysis and other data. For example, a prediction model and associated predictive function may be computed that suggest that when an account contains an old loan at a low interest rate, it is highly probable that an early balance payoff may occur. In other words, an exemplary prediction model and associated predictive function may suggest that the older a loan is, the more likely it is that the loan will be paid off before maturity.

In step 720, the probability of an early balance payoff for each account may be determined based on the generated prediction model. According to one or more aspects, the probability of an early balance payoff may be determined by applying the regression or other predictive function to a particular account. For example, the prediction model and associated predictive function described above may be applied to an account in which a loan of $900.00 is outstanding, a 6% monthly interest rate applies, the loan has been outstanding for twenty months, and the loan matures in four more months. In this example, the prediction model and associated predictive function may suggest to a financial institution that an early balance payoff is highly likely because the loan is relatively old (i.e., it is twenty months into its twenty-four month period) and because of other factors (e.g., because the interest rate is above or below a certain predetermined threshold selected by the financial institution). Additionally or alternatively, as a result of it being determined that an early balance payoff is likely in a particular account, it may be determined that the particular account should be enrolled in an incentive program designed to reduce the probability of an early balance payoff. To reduce the probability of an early balance payoff, such an incentive program may provide, for example, a longer period in which a low interest rate (or zero interest rate) applies to one or more loans outstanding in the account, and such an incentive program further may include additional fees that would apply in the event of an early balance payoff or other noncompliant action.

In step 725, each account may be classified according to its corresponding probability of an early balance payoff. In one or more configurations, a particular account may be classified according to the result that may be obtained when a prediction model and associated predictive function is applied to the particular account. For example, based on the result of a prediction model and associated predictive function, a particular account may be classified as "highly likely to have an early balance payoff," "moderately likely to have an early balance payoff," or "not likely to have an early balance payoff."

In step 730, a report that includes the calculated effectiveness values for each account and the determined probabilities of an early balance payoff for each account may be generated. The generated report also may include the classification for each account. Thus, the generated report may enable a financial institution to make a variety of strategic decisions, such as, for example, determining whether a fee should be charged in the event of an early balance payoff and the amount of such a fee, as further discussed above. Additionally or alternatively, the amount of such a fee may be calculated to ensure that profit is realized. For example, where cost and other loss amounts are known, a fee may be calculated to be an amount greater than these loss amounts, such that if an early balance payoff occurs with respect to a particular loan in an account and the fee is paid, the financial institution nevertheless makes a profit on the loan. In one or more arrangements, the fee may be calculated to be the amount of profit that the financial institution would have realized but for the early balance payoff (e.g., the amount of principal, accrued interest, and other fees that would be owed and collected when the particular loan in the particular account matured).

Figure 8:
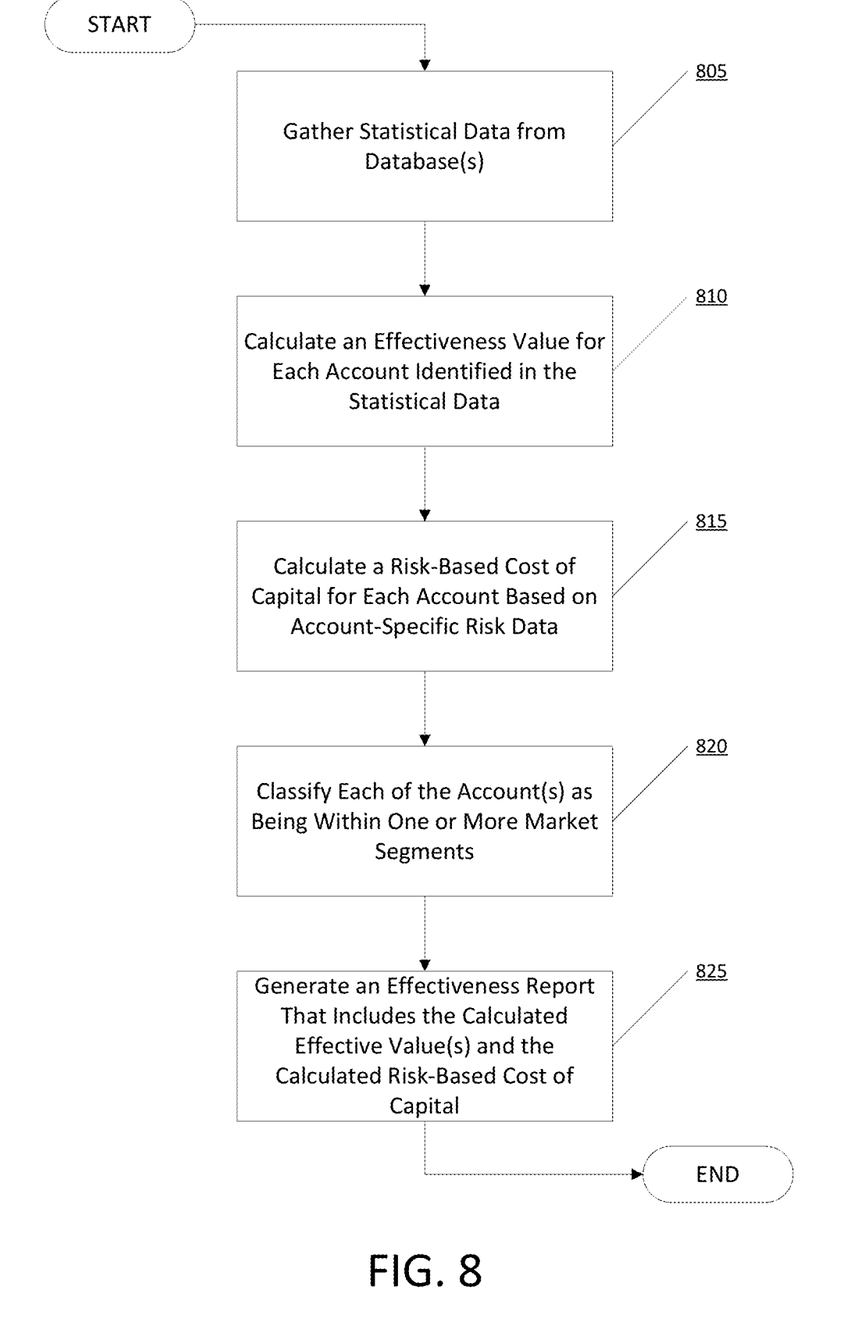
FIG. 8 illustrates a method by which a financial institution may classify one or more financial accounts based on the effectiveness of each account and the risk-based cost of capital associated with each account according to one or more aspects described herein.

FIG. 8 illustrates a method by which a financial institution may classify one or more accounts based on the effectiveness of each account and the risk-based cost of capital associated with each account. In step 805, statistical data may be gathered from one or more databases. For example, statistical data may be collected and/or compiled as described above.

In step 810, an effectiveness value for each account identified in the statistical data may be calculated. In one or more configurations, an effectiveness value for each account may be calculated by an effectiveness calculation in which cost items (e.g., funding costs, non-interest costs, interchange costs, and recovery costs) and loss items (e.g., charge offs, interest purification losses, fee purification losses, and recovery losses) may be subtracted from revenue items (e.g., collected fees revenue, collected interest revenue, and general revenue), wherein the cost items, loss items, and revenue items may be specific to a particular account under consideration, as further described above.

In step 815, a risk-based cost of capital may be calculated for each account identified in the statistical data based on account-specific risk data. For example, in a first account where the corresponding account-specific risk data indicates a high level of risk, the risk-based cost of capital may be greater than the pure opportunity cost of the financial institution lending the funds to fund the account. In this example, the risk-based cost of capital may be greater than the pure opportunity cost (which would normally be the measure of cost of capital) because the risk-based cost of capital may account for the risk in computing cost of capital (i.e., the risk-based cost of capital is upwardly adjusted because the cost of making a risky loan may be greater, at least because there is a chance that the loan ultimately will be written off as uncollectible). In another example, with respect to a second account where the corresponding account-specific risk data indicates a low level of risk, the risk-based cost of capital may be lower than the pure opportunity cost of the financial institution lending the funds to fund the account. In this example, the risk-based cost of capital may be lower than the pure opportunity cost because the risk-based cost of capital may account for the risk in computing cost of capital (i.e., the risk-based cost of capital is downwardly adjusted because the cost of making a less risk loan may be lower, at least because there is greater certainty that the loan will ultimately be repaid).

In step 820, each account identified in the statistical data may be classified as being within one or more market segments. According to one or more aspects, this classification may be based on the risk-based cost of capital and/or may be based on the account-specific risk data. For example, an account may be classified as having a "high risk-based cost of capital," a "moderate risk-based cost of capital," or a "low risk-based cost of capital." Such classifications may be based on a tiered classification system wherein different amounts of risk-based cost of capital correspond to different classifications. Additionally or alternatively, an account may be classified as having "high risk," "moderate risk," or "low risk." Such classifications may be based on a tiered classification system wherein different parameters in the account-specific risk data correspond to different classifications.

In step 825, an effectiveness report that includes the calculated effectiveness values for each account and the calculated risk-based cost of capital for each account may be generated. The generated report also may include the classification for each account. Thus, the generated report may enable a financial institution to make a variety of strategic decisions, such as, for example, decisions regarding which accounts to terminate or abandon and which accounts to maintain, as further discussed above. For example, in view of a generated report, a financial institution may choose to terminate or abandon accounts associated with a high risk-based cost of capital and may choose to maintain accounts associated with a low risk-based cost of capital. Additionally or alternatively, a financial institution may choose to charge greater fees and/or interest rates in an account associated with a high risk-based cost of capital, for example, and may choose to charge lower fees and/or interest rates, and perhaps implement other spending incentives, in an account associated with a low risk-based cost of capital.

Although not required, one of ordinary skill in the art will appreciate that various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A computer-implemented method, comprising:
   gathering statistical data about one or more financial accounts from one or more computer databases;
   calculating, on a computer, an effectiveness value for each of the one or more financial accounts based on the statistical data;
   generating, on the computer, an effectiveness report that includes the effectiveness value for each of the one or more financial accounts,
   wherein calculating the effectiveness value for each of the one or more financial accounts includes accounting for an interchange cost for each of the one or more financial accounts;
   determining, on the computer, that a first account should be enrolled in a first incentive program based on a first interchange rate; and
   determining, on the computer, that the second account should be enrolled in a second incentive program based on a second interchange rate, the second incentive program being different from the first incentive program.

2. The computer-implemented method of claim 1, further comprising:

classifying, on the computer, each of the one or more financial accounts as being within one or more market segments based on the calculated effectiveness value of each of the one or more financial accounts.

3. The computer-implemented method of claim 2, further comprising:
associating, on the computer, a first account of the one or more financial accounts with the first interchange rate based on the classifying of the first account; and
associating, on the computer, a second account of the one or more financial accounts with the second interchange rate based on the classifying of the second account, the second interchange rate being different from the first interchange rate.

4. The computer-implemented method of claim 1,
wherein the first incentive program is selected to maximize a first amount of profit to be realized from the first account, and
wherein the second incentive program is selected to maximize a second amount of profit to be realized from the second account.

5. The computer-implemented method of claim 1,
wherein the first incentive program is selected to encourage an increase in a first volume of transactions in the first account, and
wherein the second incentive program is selected to encourage a decrease in a second volume of transactions in the second account.

6. The computer-implemented method of claim 1, wherein the statistical data includes information about one or more retail activity transactions and information about exchange income associated with the one or more retail activity transactions.

7. The computer-implemented method of claim 2, wherein classifying each of the one or more financial accounts is further based on one or more interchange merchant member identifiers.

8. A non-transitory computer-readable medium having computer-executable instructions stored thereon, that when executed by a computer perform:
gathering statistical data about one or more financial accounts from one or more computer databases;
calculating an effectiveness value for each of the one or more financial accounts based on the statistical data;
generating an effectiveness report that includes the effectiveness value for each of the one or more financial accounts, wherein calculating the effectiveness value for each of the one or more financial accounts includes accounting for an interchange cost for each of the one or more financial accounts;
determining that the first account should be enrolled in a first incentive program based on a first interchange rate; and
determining that the second account should be enrolled in a second incentive program based on a second interchange rate, the second incentive program being different from the first incentive program.

9. The computer-readable medium of claim 8, having additional computer-executable instructions stored thereon that when executed by a computer perform:
classifying each of the one or more financial accounts as being within one or more market segments based on the calculated effectiveness value of each of the one or more financial accounts.

10. The computer-readable medium of claim 9, having additional computer-executable instructions stored thereon that when executed by a computer perform:
associating a first account of the one or more financial accounts with the first interchange rate based on the classifying of the first account; and
associating a second account of the one or more financial accounts with the second interchange rate based on the classifying of the second account, the second interchange rate being different from the first interchange rate.

11. The computer-readable medium of claim 8,
wherein the first incentive program is selected to maximize a first amount of profit to be realized from the first account, and
wherein the second incentive program is selected to maximize a second amount of profit to be realized from the second account.

12. The computer-readable medium of claim 8,
wherein the first incentive program is selected to encourage an increase in a first volume of transactions in the first account, and
wherein the second incentive program is selected to encourage a decrease in a second volume of transactions in the second account.

13. The computer-readable medium of claim 8, wherein the statistical data includes information about one or more retail activity transactions and information about exchange income associated with the one or more retail activity transactions.

14. The computer-readable medium of claim 9, wherein classifying each of the one or more financial accounts is further based on one or more interchange merchant member identifiers.

15. An apparatus, comprising:
a processor; and
memory storing computer-readable instructions that, when executed by the processor, cause the apparatus to perform:
gathering statistical data about one or more financial accounts from one or more computer databases;
calculating an effectiveness value for each of the one or more financial accounts based on the statistical data;
generating an effectiveness report that includes the effectiveness value for each of the one or more financial accounts, wherein calculating the effectiveness value for each of the one or more financial accounts includes accounting for an interchange cost for each of the one or more financial accounts;
determining that the first account should be enrolled in a first incentive program based on a first interchange rate; and
determining that the second account should be enrolled in a second incentive program based on a second interchange rate, the second incentive program being different from the first incentive program.

16. The apparatus of claim 15, the memory further storing computer-readable instructions that, when executed by the processor, cause the apparatus to perform:
classifying each of the one or more financial accounts as being within one or more market segments based on the calculated effectiveness value of each of the one or more financial accounts.

17. The apparatus of claim 16, the memory further storing computer-readable instructions that, when executed by the processor, cause the apparatus to perform:
associating a first account of the one or more financial accounts with the first interchange rate based on the classifying of the first account; and
associating a second account of the one or more financial accounts with the second interchange rate based on the classifying of the second account, the second interchange rate being different from the first interchange rate.

18. The apparatus of claim 15, wherein the first incentive program is selected to maximize a first amount of profit to be realized from the first account, and
wherein the second incentive program is selected to maximize a second amount of profit to be realized from the second account.

19. The apparatus of claim 15, wherein the first incentive program is selected to encourage an increase in a first volume of transactions in the first account, and
wherein the second incentive program is selected to encourage a decrease in a second volume of transactions in the second account.

20. The apparatus of claim 15, wherein the statistical data includes information about one or more retail activity transactions and information about exchange income associated with the one or more retail activity transactions.

21. The apparatus of claim 16, wherein classifying each of the one or more financial accounts is further based on one or more interchange merchant member identifiers.

* * * * *